April 5, 1932.   R. W. DUDLEY   1,852,235
LUBRICANT DISPENSER
Filed Jan. 13, 1930   2 Sheets-Sheet 1

INVENTOR:
BY R. W. Dudley.
ATTORNEY

April 5, 1932.  R. W. DUDLEY  1,852,235
LUBRICANT DISPENSER
Filed Jan. 13, 1930   2 Sheets-Sheet 2

INVENTOR:
BY R. W. Dudley.
ATTORNEY

Patented Apr. 5, 1932

1,852,235

UNITED STATES PATENT OFFICE

ROLLIN W. DUDLEY, OF ST. LOUIS, MISSOURI

LUBRICANT DISPENSER

Application filed January 13, 1930. Serial No. 420,497.

My invention relates to lubricant dispensing devices, and, more particularly to a low level warning device therefor.

The object of my present invention is the provision of a float valve mechanism adapted to be attached to the wall of a lubricant dispensing tank of the compressed air discharge type so as to be disposed within the tank and to sound an audible warning to the operator thereof when lubricant within the tank reaches a predetermined low level therein to prevent the air under pressure within the tank passing through a metering device attached to the lubricant discharge tube of the tank.

A further object of the invention resides in providing a vertically movable and rotatably supported float provided with a needle valve stem which is fixed to the float.

A further object of the invention resides in providing a valve body with a suspended member for rotatably supporting the vertically movable float provided with a needle valve stem, which needle stem is adapted to engage and disengage a valve seat in an air escape passage formed in the valve body supported by the wall of a tank containing lubricant adpated to be dispensed under air pressure and metered as it is dispensed.

A still further object of the invention is the provision of a metered gear lubricant dispensing device and low level warning device therefor which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views.

Figures 1, 2:
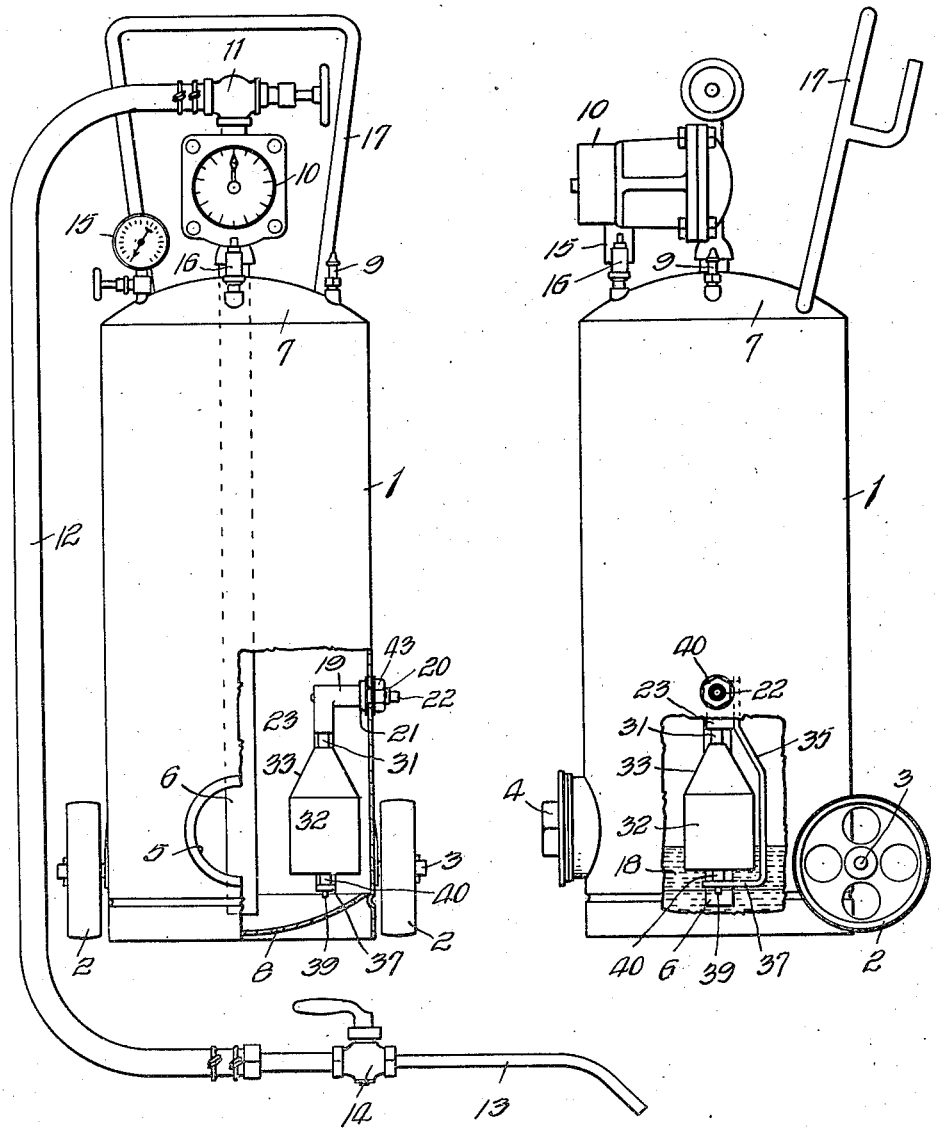
Fig. 1 is a front elevation of a lubricant dispensing device provided with my air relief valve mechanism.
Fig. 2 is a side elevation of the device.

The invention is not limited to this particular type of lubricant dispenser, but has been illustrated in connection with a metered dispenser embodying a tank or container 1 which is provided with a pair of wheels 2 mounted on an axle 3 located near the lower end of the tank, as disclosed in Fig. 2. The wall of the tank is provided near its lower end with filler plug 4 which when removed permits the tank being filled with a fluid or semifluid lubricant through the opening 5, such for instance as gear lubricant used in a differential gear case, transmission case, or similar receptacle.

Further, the dispenser tank 1 is provided with a centrally disposed lubricant discharge tube 6, which extends downwardly into the tank 1 through the top wall 7 thereof and stops short of the bottom wall 8 thereof, so that lubricant can be discharged from the tank upwardly through the discharge tube 6 by means of compressed air within the tank, which air under pressure is delivered into the tank through an air inlet valve 9 by any suitable air pressure producing means.

A suitable lubricant meter 10 is fixed to the upper end of the discharge tube 6. Connected with the meter 10 is a main shut off valve 11 to which is connected a discharge hose 12 provided with a suitable discharge nozzle 13 which is provided with a nozzle valve 14.

The tank 1 is further provided with a suitable air pressure gauge 15 and a suitable air release valve 16. In order that the tank 1 may be rolled about upon the wheels 2, I provide the tank with a suitable handle 17 which also acts as a floor rest when the tank is disposed in a horizontal position, which position the tank assumes when filling the same with lubricant designated 18.

The essential feature of my invention, that of automatically shutting off the discharge of lubricant from the tank 1 by allowing the air within the tank above the lubricant used for discharging the lubricant therefrom to escape into the outside atmosphere and thereby sounding an audible alarm for the operator which warns him that the lubricant supply within the tank has reached a predetermined low level, and, that the tank should be refilled with lubricant to prevent air instead of lubricant passing through and actuating the meter 10, will now be described.

The valve mechanism for accomplishing the above results comprises a valve body 19 having one end provided with an integral externally screw shank 20 which extends from a body flange 21. Integral with and extending from the outer end of the shank 20 is a reduced non-screw threaded nipple 22, the object of which will be apparent hereinafter. The end of the valve body 19 opposite the nipple is provided with a downwardly directed head portion 23.

A part of the valve body 19 is provided with a bored air passage 24 and the remainder of the valve body 19 is provided with a bored air passage 25 which is in axial alignment with passage 24, thus providing the valve body 19 with a longitudinal air passage which is open at the nipple or outer end thereof, but closed by means of a screw 26 at the opposite or inner end thereof. The double bore is to facilitate drilling of the air passage which is preferably drilled from both ends of the valve body 19. The bores may, or may not be of like diameters, but are illustrated as of different diameters.

The downwardly directed head portion 23 of the valve body 19 is provided with a relatively small vertically bored air passage 27 which communicates at its upper end with the bore 25 of the longitudinal air passage of the valve body, and which is a continuation of a relatively larger bore 28 which has its upper end provided with a conical seat 29 concentric with the smaller bore and adapted to be engaged by means of the conical upper end 30 of a cylindrical valve stem 31 which is fixed centrally of a suitable preferably wooden float 32 having a conical upper end 33, and, which is directed upwardly from the float 32 a suitable distance to be received in the bore 28 of the valve body head 23. The head portion 23 of the valve body 19 is provided with a pair of aligned laterally directed air inlet openings 34 which communicate with the air passage 28 just below the valve stem seat 29.

Figure 3:
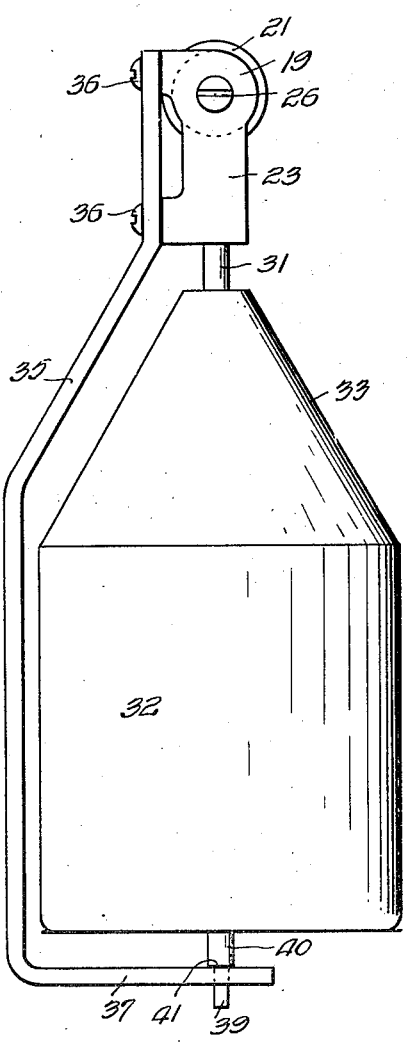
Fig. 3 is a rear elevation of the air relief valve mechanism.

The float 32 is supported by means of a suitable L-shaped strap iron member 35 which is secured at its upper end to one side of the valve body and head thereof by means of suitable fastening devices 36 so that the member 35 will be suspended from the valve body. The lower cross arm 37 of the member 35 is provided with an opening 38 adapted to rotatably receive the reduced end 39 of a pin 40 which is secured to and depends from the lower end of the float 32. The pin 40 is arranged centrally of the float 32 so as to be in axial alignment with the valve stem 31, thus permitting the float and the valve stem fixed thereto to be vertically movable as well as rotatably mounted. Downward vertical movement of the float 32 is limited by the shoulder 41 at the junction of the pin sections 39 and 40, which shoulder rests upon the cross arm 37 of the member 35, as clearly shown in Figs. 3 and 4. The float 32 being rotatably mounted, as well as vertically movable permits the needle point 30 of the valve stem 31 to always properly seat itself for closing the outlet air passage 27 of the valve body when the float is seated in lubricant and to open the air outlet passage when the lubricant has reached a predetermined low level in the tank 1, for permitting the air within the tank to escape into the outside atmosphere to sound an audible warning to the operator of the dispenser that the lubricant within the tank is low and should be refilled.

Figure 4:
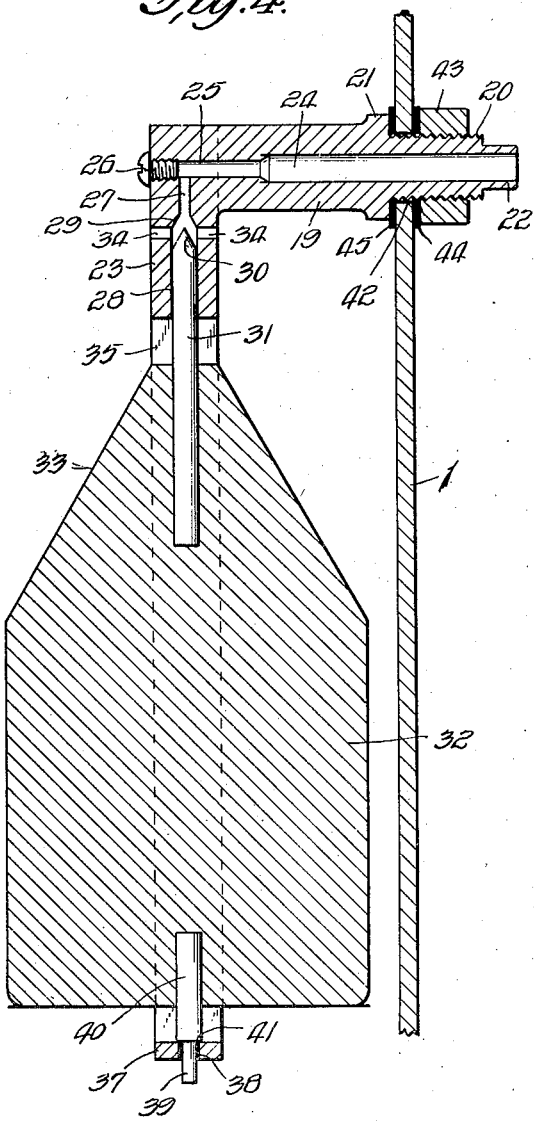
Fig. 4 is a sectional elevation of the air relief valve mechanism as carried by the tank wall.

The valve body 19 is secured to and supported by the wall of the tank 1 by having the screw threaded shank 20 of the valve body 19 pass through an opening 42 and provided with a nut 43 for securely locking the valve body in position on the tank wall. Suitable gaskets 44 and 45 are employed between the nut 43 and the outside face of the tank wall and between the valve body flange 21 and the inside face of the tank wall, respectively, as shown in Fig. 4.

The valve body 19 is applied to the tank wall so that it will be disposed within the tank at a suitable point above the bottom of the tank, as will be apparent from Figs. 1 and 2.

If, for any reason foreign matter or other substance clogs the air outlet passages of the valve body 19, and its head 23, a suitable air chuck can be applied to the nipple 22 of the valve body and compressed air forced through the air escape passages of the valve body and head thereof freeing it from any obstruction from the outside of the tank, thus obviating the necessity of having to remove the valve mechanism from the wall of the tank 1.

It is obvious that when the tank is filled with lubricant to a level above the air inlet openings 34 in the head portion 35 of the valve body 19, that the float 32 will be raised to its uppermost position thus causing the needle point 30 of valve stem 31 to engage the valve seat 29, thus preventing lubricant from being discharged through the air outlet passages of the valve body and head thereof, but that when the lubricant level within the tank has reached a predetermined point below the air inlet openings 34 of the valve body, the float 32 will lower itself with the lubricant, and the compressed air within the tank and above the lubricant for dispensing the lubricant therefrom will enter the air inlet openings 34 and as the needle valve point 30 has lowered with the float 32 thereby disengaging itself from the seat 29 and allowing the escape of air from the tank to the outside atmosphere through the air outlet passages of the valve body, and by such escape sound an audible warning to the operator of the dispenser that a predetermined low level of the lubricant has been reached, and that it is time to refill the tank with lubricant to prevent the air under pressure within the tank being forced through the lubricant discharge tube 6 and causing the same to register on the meter 10 even though no lubricant is being discharged from the tank through the meter 10.

From the foregoing description, it is evident that the float valve mechanism serves a definite and desirable need for the station owner, the operator, and the car owner, whereas without its use the air contained in the tank 1 under pressure would pass through the meter 10 causing it to register, even though no lubricant was being dispensed, and it serves to warn the operator that the safe low lubricant level has been reached and that the tank 1 should be refilled with lubricant.

As the lubricant is forced from the tank by air pressure, it is evident that lubricant cannot be dispensed and its flow naturally and automatically stopped when the air pressure within the tank 1 is allowed to escape into the outside atmosphere through the float actuated air relief valve.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. In combination with a tank for dispensing transmission and differential lubricant under air pressure, of a valve casing secured to the wall of the tank and having a passage for air to pass through from the interior of the tank into the outside atmosphere when lubricant within the tank recedes to a predetermined low level therein, a needle valve for normally closing said passage, a cylindrical vertically disposed float depending from the needle valve, a support secured to and directed downwardly from the valve casing for rotatably supporting the float and to permit of up and down movement thereof to cause the needle valve to close and open the aforesaid passage and an air hose chuck receiving nipple formed at one end of the valve casing and disposed to the outside of the tank.

2. In combination with an air operated, meter equipped lubricant dispensing tank, of a valve body, a screw threaded nipple including a nut for detachably securing the valve body to the side wall of the tank, an extension directed downwardly from the inner end of the valve body, an air hose chuck nipple formed at the outer end of the screw threaded nipple of the valve body, an air escape passage directed from the outer end of the chuck nipple to a point near the inner end of the valve body, an air passage disposed at a right angle to the first mentioned air escape passage and communicating with the inner end thereof, a needle valve passage directed downwardly through the valve body extension, a needle valve seat the juncture of the needle valve passage and the second mentioned air escape passage, a pair of opposed air inlet openings in the upper end of the valve body extension and communicating with the needle valve passage first below the valve seat, a hanger depending from the valve casing and its extension, a vertically disposed cylindrical float having a truncated upper end, a needle valve directed upwardly from the float, the upper end of said needle valve being journaled in the needle valve passage of the valve body extension, means for pivotally mounting said float on the lower end of said hanger and means for limiting downward movement of the float to open the air inlet openings to the air escape passage.

In testimony whereof, I have hereunto affixed my signature.

ROLLIN W. DUDLEY.